United States Patent
Meo et al.

(10) Patent No.: US 11,409,042 B2
(45) Date of Patent: Aug. 9, 2022

(54) REINFORCEMENT DEVICE FOR OPTICAL FIBER FUSION SPLICING SECTION AND FUSION SPLICER PROVIDED WITH SAME

(71) Applicant: SUMITOMO ELECTRIC OPTIFRONTIER CO., LTD., Yokohama (JP)

(72) Inventors: Ryosuke Meo, Yokohama (JP); Hiroshi Takayanagi, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 0 days.

(21) Appl. No.: 17/280,527

(22) PCT Filed: Sep. 24, 2019

(86) PCT No.: PCT/JP2019/037162
§ 371 (c)(1),
(2) Date: Mar. 26, 2021

(87) PCT Pub. No.: WO2020/071166
PCT Pub. Date: Apr. 9, 2020

(65) Prior Publication Data
US 2022/0035098 A1    Feb. 3, 2022

(30) Foreign Application Priority Data

Oct. 2, 2018 (JP) .............................. JP2018-187278

(51) Int. Cl.
*G02B 6/255* (2006.01)

(52) U.S. Cl.
CPC ......... *G02B 6/2558* (2013.01); *G02B 6/2551* (2013.01); *G02B 6/2553* (2013.01)

(58) Field of Classification Search
CPC ... G02B 6/2551; G02B 6/2553; G02B 6/2558
See application file for complete search history.

(56) References Cited

U.S. PATENT DOCUMENTS

| | | | |
|---|---|---|---|
| 8,950,955 B2 * | 2/2015 | Fukuda | G02B 6/2553 385/99 |
| 9,134,480 B2 * | 9/2015 | Liu | H05B 3/10 |

(Continued)

FOREIGN PATENT DOCUMENTS

| | | |
|---|---|---|
| CN | 107045159 A | 8/2017 |
| CN | 107656337 A | 2/2018 |

(Continued)

*Primary Examiner* — Ryan A Lepisto
(74) *Attorney, Agent, or Firm* — Oliff PLC

(57) ABSTRACT

A reinforcement device for an optical fiber fusion-spliced portion, which reinforces a fusion-spliced portion of optical fibers by heating and shrinking a reinforcement sleeve covering the fusion spliced portion, includes a heater configured to heat the reinforcement sleeve. The heater includes a sleeve housing portion capable of housing the reinforcement sleeve. The sleeve housing portion includes a first wall portion extending in a longitudinal direction of the sleeve housing portion and a second wall portion facing the first wall portion. The first wall portion and the second wall portion are configured such that a distance therebetween increases from a bottom portion side of the sleeve housing portion toward a top portion side of the sleeve housing portion in a cross-section orthogonal to the longitudinal direction. At least one bent portion is formed to at least one of the first wall portion and the second wall portion in the cross-section.

6 Claims, 11 Drawing Sheets

(56) References Cited

U.S. PATENT DOCUMENTS

| | | | |
|---|---|---|---|
| 10,557,991 B2* | 2/2020 | Zhao | G02B 6/2558 |
| 2012/0243838 A1* | 9/2012 | Sato | G02B 6/2558 |
| | | | 385/96 |
| 2018/0356594 A1* | 12/2018 | Zhao | B29C 61/02 |

FOREIGN PATENT DOCUMENTS

| | | |
|---|---|---|
| JP | S60-021703 U | 2/1985 |
| JP | H10-332979 A | 12/1998 |
| JP | 2004-042317 A | 2/2004 |
| JP | 2010-217271 A | 9/2010 |
| JP | 2017-142469 A | 8/2017 |
| WO | 02/046716 A1 | 6/2002 |

\* cited by examiner

//  REINFORCEMENT DEVICE FOR OPTICAL
FIBER FUSION SPLICING SECTION AND
FUSION SPLICER PROVIDED WITH SAME

TECHNICAL FIELD

The present disclosure relates to a reinforcement device for an optical fiber fusion-spliced portion and a fusion-splicing apparatus including the same.

The present application claims priority from Japanese Patent Application No. 2018-187278, filed on Oct. 2, 2018, the entire subject content of which is incorporated herein by reference.

BACKGROUND ART

Patent Literature 1 discloses a heating device in which a heater faces a resin sleeve that covers and reinforces a spliced portion between optical fibers, and the heater is pressed toward the sleeve by a biasing member to heat and shrink the sleeve.

Similarly, Patent Literature 2 discloses a heater in which a heat conductor (heater) is disposed to be driven forward or backward on an outer circumferential surface of a heat shrinkable sleeve that covers a spliced portion of optical fibers, and the heat conductor is moved to be pressed against the sleeve by a heater driving unit in accordance with a shrink amount of the sleeve.

Patent Literature 3 discloses a heating device for a reinforcement sleeve that includes a housing portion that houses the reinforcement sleeve that reinforces a fusion-spliced portion of optical fibers, a heater provided inside the housing portion, and a lid portion that is openable and closable with respect to the housing portion. In the heating device, when the lid portion is in a closed state with respect to the housing portion, the reinforcement sleeve housed in the housing portion is pressed against the heater to heat the reinforcement sleeve.

CITATION LIST

Patent Literature

Patent Literature 1: JP-A-H10-332979
Patent Literature 2: JP-A-2004-42317
Patent Literature 3: JP-A-2017-142469

SUMMARY OF INVENTION

Solution to Problem

To achieve an object of the present disclosure, the present disclosure provides a reinforcement device for an optical fiber fusion-spliced portion, which reinforces a fusion-spliced portion of optical fibers by heating and shrinking a reinforcement sleeve covering the fusion spliced portion, the reinforcement device including:

a heater configured to heat the reinforcement sleeve, in which the heater includes a sleeve housing portion capable of housing the reinforcement sleeve, and the sleeve housing portion includes at least a first wall portion extending in a longitudinal direction of the sleeve housing portion and a second wall portion facing the first wall portion and extending in the longitudinal direction, the first wall portion and the second wall portion are configured such that a distance between the first wall portion and the second wall portion increases from a bottom portion side of the heater toward a top portion side of the heater in a cross-section orthogonal to the longitudinal direction, and at least one bent portion is formed to at least one of the first wall portion and the second wall portion in the cross-section.

DESCRIPTION OF EMBODIMENTS

Technical Problem

Figure 1:
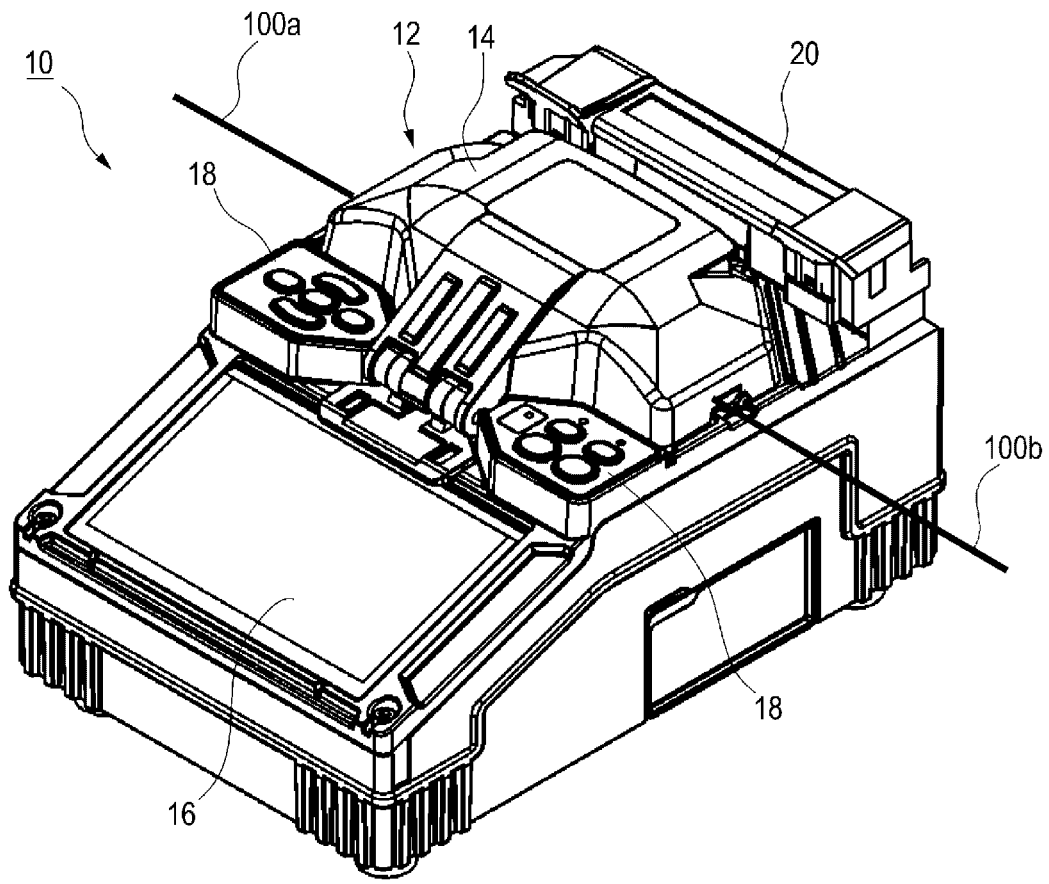
FIG. 1 is a perspective view illustrating an example of an optical fiber fusion-splicing apparatus according to an embodiment of the present application.

In the configurations disclosed in Patent Literatures 1 and 2, when a plurality of types of sleeves having different diameters are heated and shrunk, a distance between a pair of heaters (heat conductors) needs to be changed according to the thickness and shrink amounts of the sleeves, and a driving mechanism for moving the heaters and a sensor for measuring the distance between the heaters are necessary.

In the heating device disclosed in Patent Literature 3, only a heater having one predetermined shape is mounted, and it is necessary for the heater having the one predetermined shape to shrink a plurality of types of sleeves having different diameters. Therefore, the heater needs to be designed to have a shape and a size coping with a sleeve having a largest diameter, and a contact area between the heater and a sleeve having a smallest diameter is small, and thus thermal efficiency cannot be optimized.

Therefore, an object of the present disclosure to provide a reinforcement device for an optical fiber fusion-spliced portion and a fusion-splicing apparatus including the same that can improve thermal efficiency for each of a plurality of types of reinforcement sleeves having different diameters with a simple configuration and shorten heat treatment time for the reinforcement sleeves.

Advantageous Effects of Invention

According to the present disclosure, it is possible to provide a reinforcement device for an optical fiber fusion-spliced portion and a fusion-splicing apparatus including the same, which can improve thermal efficiency for each of a plurality of types of reinforcement sleeves having different diameters with a simple configuration and shorten heat treatment time for the reinforcement sleeves.

Descriptions of Embodiments

First, aspects of the present disclosure will be listed and described.

According to an aspect of the present disclosure, there is provided (1) a reinforcement device for an optical fiber fusion-spliced portion, which reinforces a fusion-spliced portion of optical fibers by heating and shrinking a reinforcement sleeve covering the fusion spliced portion, the reinforcement device including:

a heater configured to heat the reinforcement sleeve, in which the heater includes a sleeve housing portion capable of housing the reinforcement sleeve.

the sleeve housing portion includes at least a first wall portion extending in a longitudinal direction of the sleeve housing portion and a second wall portion facing the first wall portion and extending in the longitudinal direction, the first wall portion and the second wall portion are configured such that a distance between the first wall portion and the second wall portion increases from a bottom portion side of the heater toward a top portion side of the heater in a cross-section orthogonal to the longitudinal direction, and at least one bent portion is formed to at least one of the first wall portion and the second wall portion in the cross-section.

According to this configuration, with a simple configuration in which at least one bent portion is formed to at least one of the first wall portion and the second wall portion of the heater, it is possible to increase a contact area between the heater and each of reinforcement sleeves having different diameters. As a result, it is possible to improve thermal efficiency for each of a plurality of types of sleeves having different diameters and shorten heat treatment time for the reinforcement sleeves. Further, since an amount of heat escaping from a surface of the heater is reduced by increasing a contact area between the heater and the reinforcement sleeve, it is possible to complete the heat treatment with a smaller amount of heat than in the related art and reduce a consumed power amount of the heater.

(2) The first wall portion may be line-symmetrical with the second wall portion in the cross-section.

According to this configuration, it is possible to uniformize the heat distribution when the heater is heated and maintain a constant thermal shrinkage rate of the reinforcement sleeve.

(3) At least two bent portions may be formed to each of the first wall portion and the second wall portion in the cross-section.

(4) The heater may further include a third wall portion connecting an end portion of the first wall portion and an end portion of the second wall portion on the bottom portion side.

The heater may include these configurations to increase a contact area between the heater and each of the reinforcement sleeves having different diameters.

(5) According to another aspect of the present disclosure, there is provided a fusion-splicing apparatus including the reinforcement device according to any one of the above (1) to (4).

According to this configuration, it is possible to provide a fusion-splicing apparatus including a reinforcement device for an optical fiber fusion-spliced portion that can improve thermal efficiency for each of a plurality of types of reinforcement sleeves having different diameters with a simple configuration and shorten heat treatment time for the reinforcement sleeves.

Details of Embodiments

Hereinafter, an example of an embodiment of a reinforcement device for an optical fiber fusion-spliced portion and a fusion-splicing apparatus including the same according to the present disclosure will be described with reference to the drawings.

First, fusion-splicing treatment of optical fibers by the optical fiber fusion-splicing apparatus according to the present embodiment and heat treatment of an optical fiber reinforcement member by a heat treatment device according to the present embodiment will be described with reference to FIGS. 1 to 2B.

As illustrated in FIG. 1, a fusion-splicing apparatus 10 is, for example, an apparatus that fusion-splices optical fibers 100a, 100b to each other at a site where the construction of an optical fiber facility is performed, and further, reinforces a fusion-spliced portion. The fusion-splicing apparatus 10 includes a fusion treatment portion 12 that fusion-splices the optical fibers 100a, 100b to each other, and a reinforcement device 20 that reinforces the fusion-spliced portion (example of an optical fiber fusion-spliced portion) of the optical fibers 100a, 100b.

The fusion treatment portion 12 can be opened and closed by an opening and closing cover 14. When the opening and closing cover 14 is opened, end surfaces of the optical fibers 100a, 100b extending from optical fiber holders (not illustrated) mounted inside the opening and closing cover 14 are disposed in a fusion position. In the fusion treatment portion 12, a pair of electrodes (not illustrated) are disposed to face each other in the fusion position, and the end surfaces of the optical fibers 100a, 100b are fusion-spliced to each other in the fusion position by the discharge of the pair of electrodes.

The fusion-splicing apparatus 10 further includes a monitor 16 on a front surface side. The monitor 16 displays an image of a fusion portion of the optical fibers 100a, 100b captured by a microscope including an image capturing element such as a charge-coupled device (CCD). An operator can perform the fusion work while watching the image on the monitor 16. The monitor 16 also serves as an operation unit for operating the fusion treatment portion 12 and the reinforcement device 20, and various operations can be performed by the operator touching the monitor 16. An operation unit 18 including a power switch and the like is provided above the monitor 16.

Figure 2A:
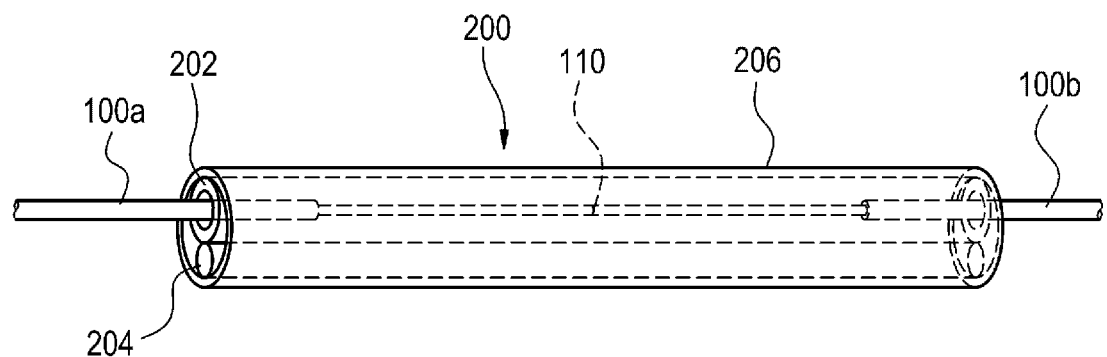
FIG. 2A illustrates an example of a state in which a fusion-spliced portion of optical fibers is covered with an optical fiber reinforcement sleeve that is subjected to heat treatment by a reinforcement device provided in the optical fiber fusion-splicing apparatus in FIG. 1.

As illustrated in FIG. 2A, when the optical fibers 100a, 100b are fusion-spliced to each other, sheaths at end portions of the optical fibers 100a, 100b are first removed to expose bare fiber portions. Next, in a state in which the optical fiber 100b is inserted into a reinforcement sleeve 200, the optical fibers 100a, 100b are installed in the fusion treatment portion 12 of the optical fiber fusion-splicing apparatus 10, and the bare fiber portions exposed at the end portions of the optical fibers 100a, 100b are fusion-spliced to each other by arc discharge or the like to form a fusion-spliced portion 110 (see FIG. 1).

Thereafter, the spliced optical fibers 100a, 100b are removed out of the fusion treatment portion 12, and the reinforcement sleeve 200 is moved to cover the fusion-spliced portion 110 (see FIG. 2A). Next, the reinforcement sleeve 200 is housed in the reinforcement device 20 installed adjacent to the fusion treatment portion 12 to perform predetermined heating treatment. As a result, the reinforcement sleeve 200 is heated and shrunk and the splicing between the optical fiber 100a and the optical fiber 100b is reinforced.

As illustrated in FIG. 2A, the reinforcement sleeve 200 includes a heat fusible inner tube 202 into which the fusion-spliced portion 110 and the optical fibers 100a, 100b in the vicinity thereof are inserted, a tensile strength member 204 disposed in the vicinity of an outer circumferential surface of the inner tube 202 in a longitudinal direction of the inner tube 202 to reinforce the fusion-spliced portion 110 not to bend, and a heat shrinkable outer tube 206 disposed to cover the inner tube 202 and the tensile strength member 204. The tensile strength member 204 is made of, for example, a copper wire. The inner tube 202 is disposed at an upper portion inside the outer tube 206 relative to a heater 30 mounted on the reinforcement device 20. The heater 30 will be described later. The tensile strength member 204 is disposed at a lower portion inside the outer tube 206. The outer tube 206 of the reinforcement sleeve 200 has, for example, an outer diameter of about 3.5 mm and an inner diameter of about 3.1 mm. The length of the reinforcement sleeve 200 in the longitudinal direction is, for example, about 60 mm.

Figure 2B:
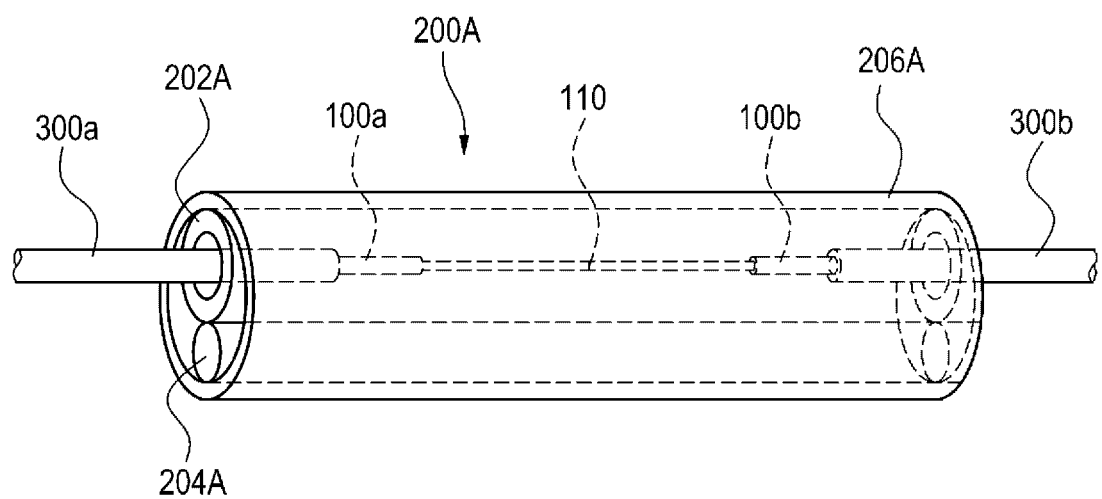
FIG. 2B illustrates an example of a state in which a fusion-spliced portion of drop cables is covered with a drop cable reinforcement sleeve that is subjected to heat treatment by the reinforcement device in FIG. 2A.

FIG. 2B illustrates a drop cable reinforcement sleeve 200A for reinforcing an optical fiber fusion-spliced portion between drop cables. Generally, a drop cable has a configuration in which a cable body portion obtained by applying a sheath to an optical fiber and a support wire portion obtained by applying a sheath to a support wire are integrated with each other by a coupling portion. Since the work of reinforcing the drop cables is usually performed on the cable body portion with the support wire portion peeled off, the cable body portion is referred to as "drop cable" (drop cables 300a, 300b) in the present embodiment.

As illustrated in FIG. 2B, the drop cable reinforcement sleeve 200A includes a heat fusible inner tube 202A, an elongated tensile strength member 204A, and a heat shrinkable outer tube 206A disposed to cover the inner tube 202A and the tensile strength member 204A. The fusion-spliced portion 110 between the optical fibers 100a, 100b led out from respective end portions of the drop cables 300a, 300b and the optical fibers 100a, 100b and the drop cables 300a, 300b in the vicinity of the fusion-spliced portion 110 are inserted into the inner tube 202A. The inner tube 202A, the tensile strength member 204A, and the outer tube 206A of the drop cable reinforcement sleeve 200A have diameters larger than diameters of the inner tube 202, the tensile strength member 204, and the outer tube 206 of the optical fiber reinforcement sleeve 200 illustrated in FIG. 2A, respectively, according to the size of the drop cables 300a, 300b. The outer tube 206A of the reinforcement sleeve 200A has, for example, an outer diameter of about 6.0 mm and an inner diameter of about 5.6 mm. The length of the reinforcement sleeve 200A in the longitudinal direction is, for example, about 60 mm.

Figure 3:
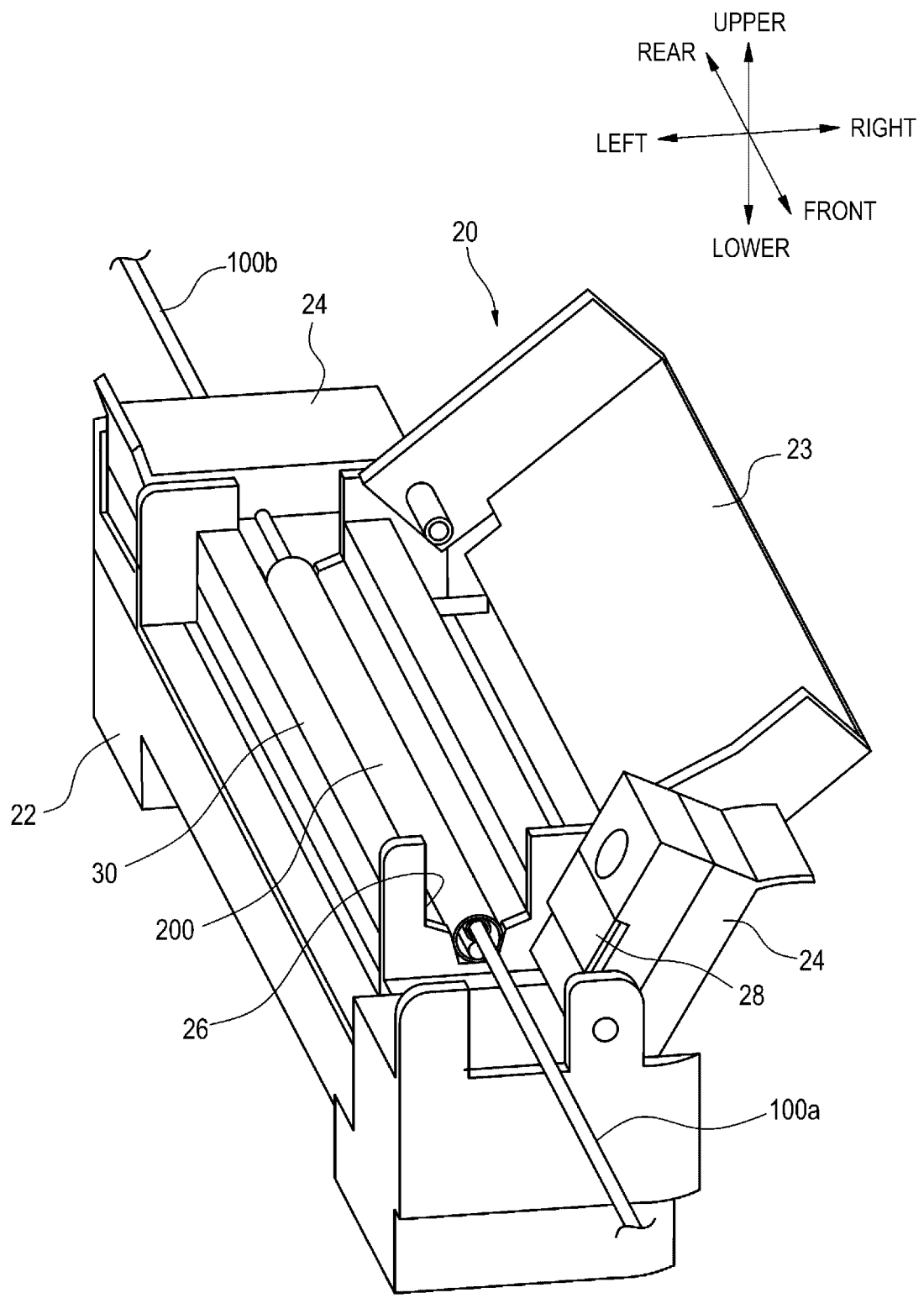
FIG. 3 is a perspective view illustrating a specific configuration of the reinforcement device.

Next, the reinforcement device 20 according to the present embodiment will be described with reference to FIGS. 3 and 4. FIG. 3 is a perspective view illustrating a specific configuration of the reinforcement device 20. "Left-right direction", "front-rear direction", and "upper-lower direction" in the present embodiment are relative directions of the reinforcement device 20 illustrated in FIG. 3 and are set for convenience of description. The "front-rear direction" is a direction including "forward direction" and "rearward direction". The "left-right direction" is a direction including "leftward direction" and "rightward direction". The "upper-lower direction" is a direction including "upward direction" and "downward direction".

As illustrated in FIG. 3, the reinforcement device 20 includes a body portion 22, a cover 23, and clamp portions 24. The body portion 22 includes a heater housing portion 26 provided in a central portion thereof in the front-rear direction. The heater 30 is provided on an inner surface of the heater housing portion 26. The heater 30 includes a sleeve housing portion 31 capable of housing the optical fiber reinforcement sleeve 200 and the drop cable reinforcement sleeve 200A (see FIG. 4). When the heater 30 generates heat, the inner tubes 202, 202A of the reinforcement sleeves 200, 200A housed in the sleeve housing portion 31 of the heater 30 melt and the outer tubes 206, 206A shrink. The heater 30 preferably has a heating temperature distribution by which central portions of the inner tubes 202, 202A and the outer tubes 206, 206A are melted or shrunk by heating at a high temperature and then end portions of the inner tubes 202, 202A and the outer tubes 206, 206A are melted or shrunk. Thereby, bubbles generated in the inner tubes 202, 202A and the outer tubes 206, 206A during heating are easily removed from the end portions of the inner tubes 202, 202A and the outer tubes 206, 206A.

The cover 23 is provided on an upper surface side of the heater 30 in an openable and closable manner to prevent a hand from touching the heater 30 during the heat treatment and prevent the heating environment from changing by the outside air.

A pair of clamp portions 24 are provided on both sides of the heater 30 in the front-rear direction to hold the optical fibers 100a, 100b and the drop cables 300a, 300b. The clamp portions 24 are rotatable relative to the reinforcement device 20 and configured to hold the optical fibers 100a, 100b or the drop cables 300a, 300b connected to both ends of the fusion-spliced portion 110 by dampers 28. By clamping the optical fibers 100a, 100b or the drop cables 300a, 300b by the dampers 28 of the clamp portions 24, the fusion-spliced portion 110 is positioned in the heater 30.

Although not illustrated, the reinforcement device 20 further includes a power supply unit for causing the heater 30 to generate heat, a switch for starting the heat generation of the heater 30, and the like.

Figure 4:
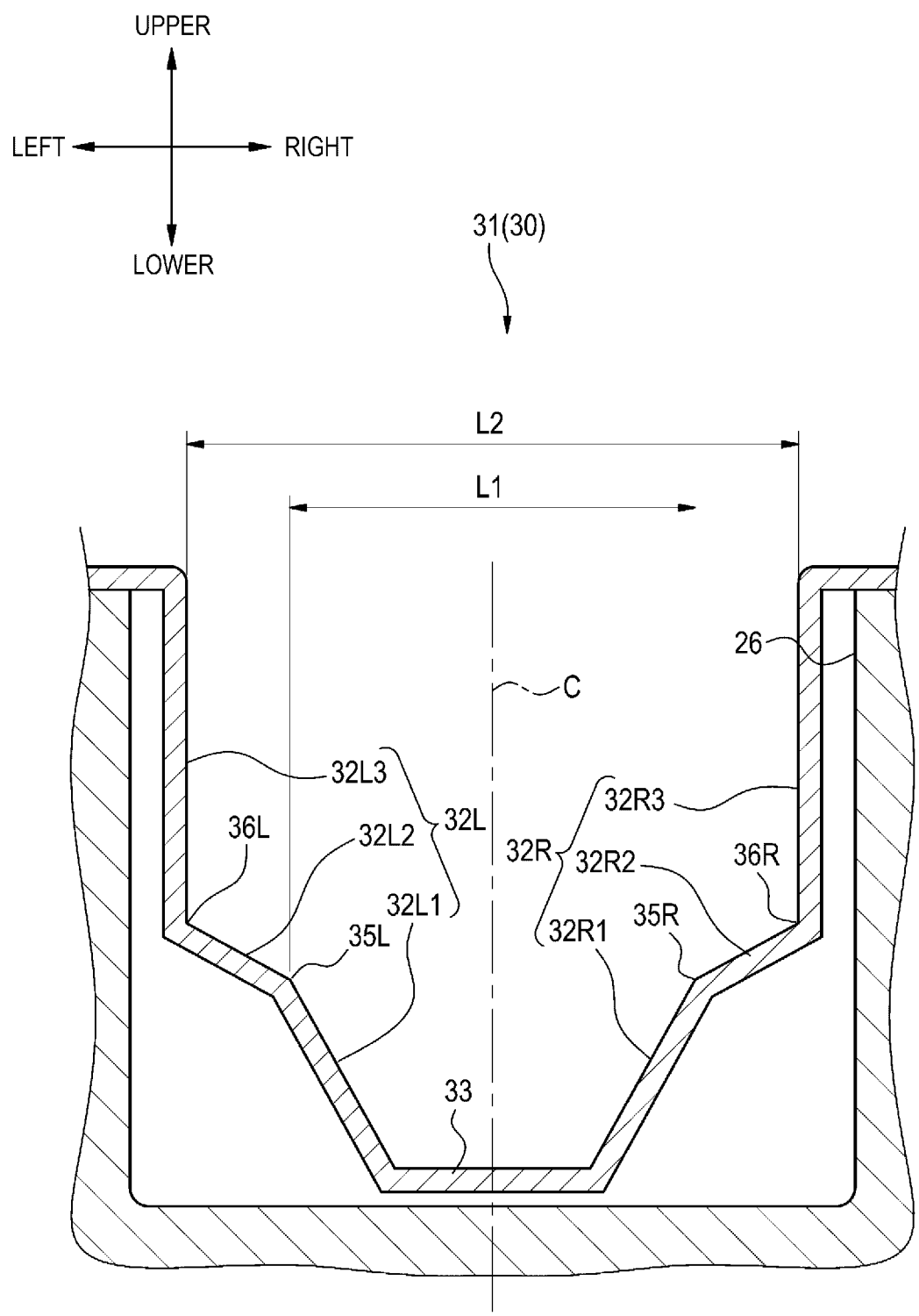
FIG. 4 is a cross-sectional view illustrating an example of a heater provided in the reinforcement device.

FIG. 4 is a cross-sectional view of the heater 30 in a direction orthogonal to the longitudinal direction (front-rear direction) of the sleeve housing portion 31.

As illustrated in FIG. 4, the heater 30 includes a left wall surface 32L and a right wall surface 32R that face each other and extend in the longitudinal direction of the sleeve housing portion 31, and a bottom surface (wall surface) 33 formed to connect a lower end portion of the left wall surface 32L and a lower end portion of the right wall surface 32R. The bottom surface 33 is a flat surface extending in the left-right direction.

The left wall surface 32L is line-symmetrical with the right wall surface 32R in the cross-section of FIG. 4. That is, in the example of FIG. 4, for example, the left wall surface 32L and the right wall surface 32R are line-symmetric relative to a symmetry axis C extending in a vertical direction (upper-lower direction) and passing through a center of the sleeve housing portion 31.

The left wall surface 32L includes a lower side surface 32L1, a middle side surface 32L2, and an upper side surface 32L3. The lower side surface 32L1 is continuous with the bottom surface 33 of the heater 30, and bends obliquely toward the upper-left side from the bottom surface 33. That is, the lower side surface 32L1 is inclined outward (leftward in FIG. 4) from a bottom portion side toward a top portion side of the sleeve housing portion 31. The middle side surface 32L2 is continuous with the lower side surface 32L1 via a convex bent portion 35L protruding toward the inside of the sleeve housing portion 31. The middle side surface 32L2 is inclined outward from the bottom portion side toward the top portion side of the sleeve housing portion 31. The upper side surface 32L3 is continuous with the middle side surface 32L2 via a concave bent portion 36L recessed toward the outside of the sleeve housing portion 31. The upper side surface 32L3 is a substantially vertical surface extending in the upper-lower direction.

Similarly, the right wall surface 32R includes a lower side surface 32R1, a middle side surface 32R2, and an upper side surface 32R3. The lower side surface 32R1 is continuous with the bottom surface 33 of the heater 30, and bends obliquely toward the upper-left side from the bottom surface 33. That is, the lower side surface 32R1 is inclined outward (rightward in FIG. 4) from the bottom portion side toward the top portion side of the sleeve housing portion 31. An inclination angle of the lower side surface 32R1 of the right wall surface 32R relative to the upper-lower direction is substantially the same as an inclination angle of the lower side surface 32L1 of the left wall surface 32L relative to the upper-lower direction. The middle side surface 32R2 is continuous with the lower side surface 32R1 via a convex bent portion 35R protruding toward the inside of the sleeve housing portion 31. The middle side surface 32R2 is inclined outward from the bottom portion side toward the top portion side of the sleeve housing portion 31. An inclination angle of the middle side surface 32R2 of the right wall surface 32R relative to the upper-lower direction is substantially the same as an inclination angle of the middle side surface 32L2 of the left wall surface 32L relative to the upper-lower direction. The upper side surface 32R3 is continuous with the middle side surface 32R2 via a concave bent portion 36R recessed toward the outside of the sleeve housing portion 31. The upper side surface 32R3 is a substantially vertical surface extending in the upper-lower direction.

The lower side surface 32L1 of the left wall surface 32L and the lower side surface 32R1 of the right wall surface 32R are configured such that a distance between the lower side surface 32L1 and the lower side surface 32R1 increases from the bottom portion side toward the top portion side of the sleeve housing portion 31 in the cross-section of FIG. 4. The middle side surface 32L2 of the left wall surface 32L and the middle side surface 32R2 of the right wall surface 32R are configured such that a distance between the middle side surface 32L2 and the middle side surface 32R2 increases from the bottom portion side toward the top portion side of the sleeve housing portion 31. The upper side surface 32L3 of the left wall surface 32L and the upper side surface 32R3 of the right wall surface 32R are substantially parallel from the bottom portion side to the top portion side of the sleeve housing portion 31.

In this manner, the left wall surface 32L and the right wall surface 32R are configured such that a distance between the left wall surface 32L and the right wall surface 32R increases from the bottom portion side toward the top portion side of the sleeve housing portion 31. Accordingly, a maximum distance L1 in the left-right direction between the lower side surface 32L1 of the left wall surface 32L and the lower side surface 32R1 of the right wall surface 32R (that is, a distance between the bent portion 35L and the bent portion 35R) is smaller than a maximum distance L2 in the left-right direction between the middle side surface 32L2 or the upper side surface 32L3 of the left wall surface 32L and the middle side surface 32R2 or the upper side surface 32R3 of the right wall surface 32R. Specifically, the maximum distance L1 between the lower side surface 32L1 and the lower side surface 32R1 is set to be slightly larger than a maximum diameter of the reinforcement sleeve 200 through which the optical fibers 100a, 100b are inserted. The maximum distance L2 between the middle side surface 32L2 or the upper side surface 32L3 and the middle side surface 32R2 or the upper side surface 32R3 is set to be substantially the same as or slightly larger than a maximum diameter of the reinforcement sleeve 200A through which the drop cables 300a, 300b are inserted.

Figure 5A:
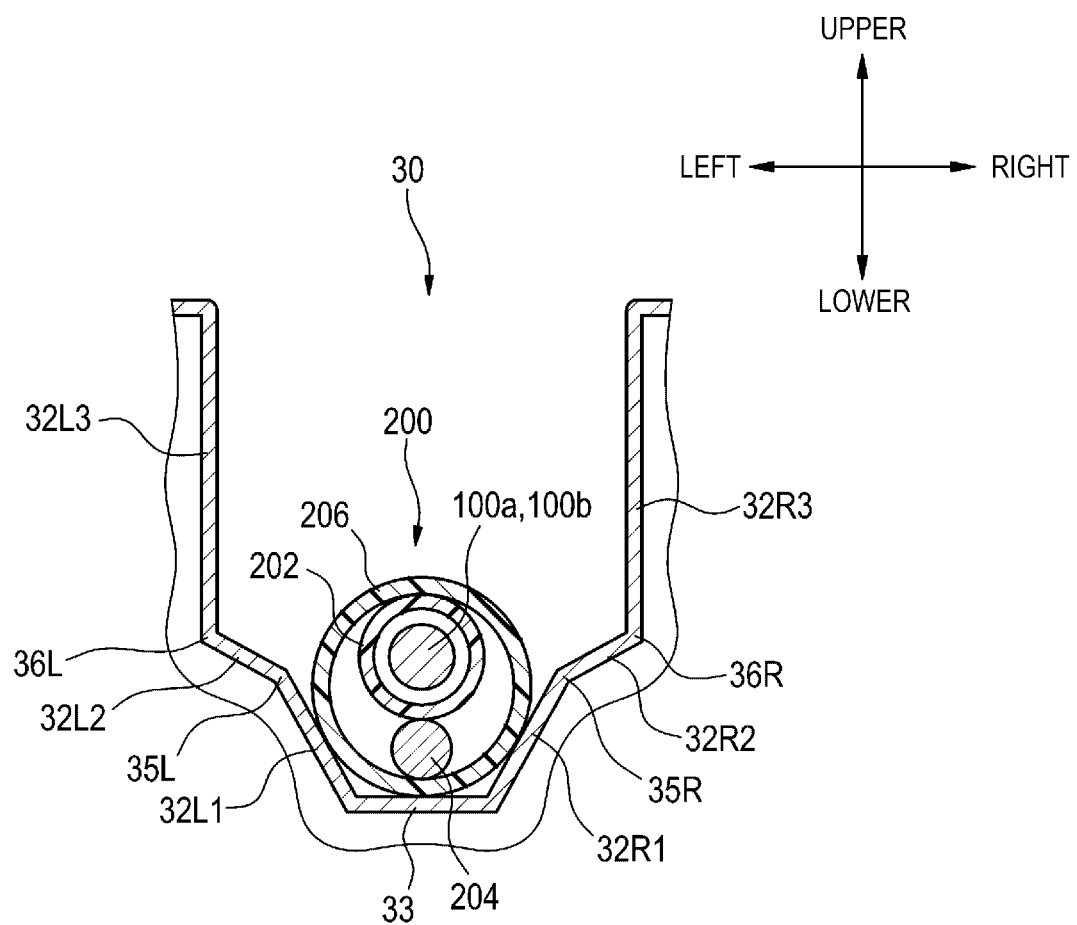
FIG. 5A is a cross-sectional view illustrating a state in which the optical fiber reinforcement sleeve covering the fusion-spliced portion between optical fibers is housed in the heater in FIG. 4.
Figure 5B:
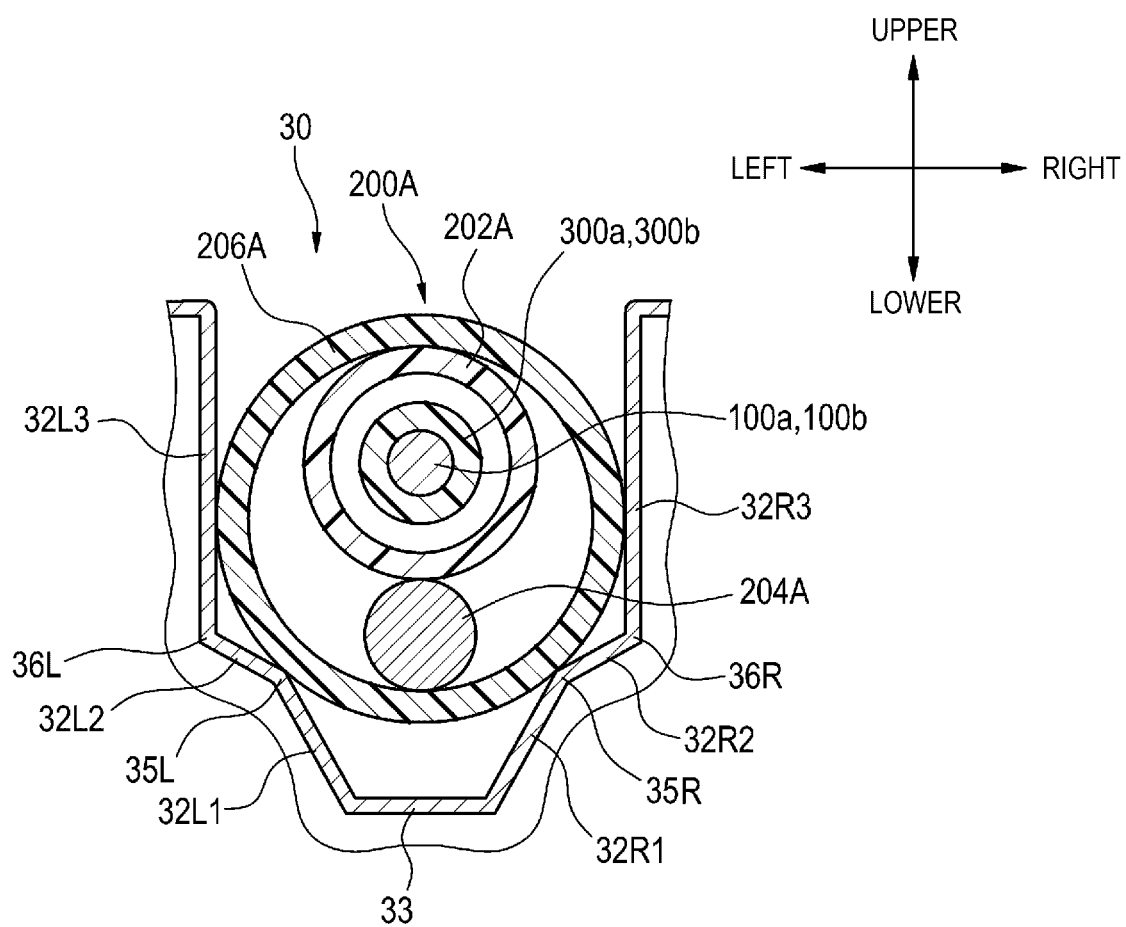
FIG. 5B is a cross-sectional view illustrating a state in which the drop cable reinforcement sleeve covering the fusion-spliced portion between drop cables is housed in the heater in FIG. 4.

FIG. 5A is a cross-sectional view of a state in which the optical fiber reinforcement sleeve 200 through which the optical fibers 100a, 100b are inserted is housed in the heater 30. FIG. 5B is a cross-sectional view of a state in which the drop cable reinforcement sleeve 200A through which the drop cables 300a, 300b are inserted is housed in the heater 30.

As illustrated in FIG. 5A, when the optical fiber reinforcement sleeve 200 is housed in the sleeve housing portion 31 of the heater 30, the reinforcement sleeve 200 is guided downward by the middle side surfaces 32L2, 32R2 of the left and right wall surfaces 32L, 32R, and is disposed in a space defined by the lower side surfaces 32L1, 32R1 of the left and right wall surfaces 32L, 32R and the bottom surface 33. As a result, at least a part of the reinforcement sleeve 200 comes into contact with the lower side surface 32L1 of the left wall surface 32L, the lower side surface 32R1 of the right wall surface 32R, and the bottom surface 33. That is, at least three portions of an outer surface of the outer tube 206 of the optical fiber reinforcement sleeve 200 housed in the heater 30 come into contact with the heater 30.

On the other hand, as illustrated in FIG. 5B, when the drop cable reinforcement sleeve 200A is housed in the sleeve housing portion 31, the downward movement of the reinforcement sleeve 200A is restricted by the bent portions 35L, 35R between the lower side surfaces 32L1, 32R1 and the middle side surfaces 32L2, 32R2 of the left and right wall surfaces 32L, 32R. As a result, at least a part of the reinforcement sleeve 200A comes into contact with the bent portion 35L and the upper side surface 32L3 of the left wall surface 32L of the heater 30 and the bent portion 35R and the upper side surface 32R3 of the right wall surface 32R. That is, at least four portions of an outer surface of the outer tube 206A of the drop cable reinforcement sleeve 200A housed in the sleeve housing portion 31 come into contact with the heater 30.

Figure 6A:
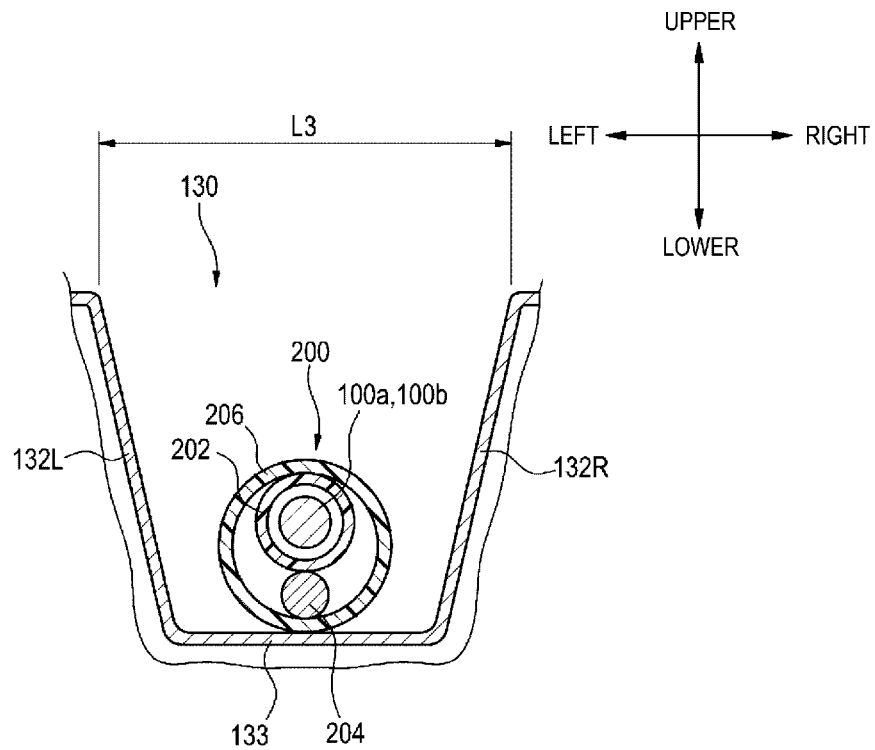
FIG. 6A is a cross-sectional view illustrating a state in which the optical fiber reinforcement sleeve is housed in a heater having a related art configuration.
Figure 6B:
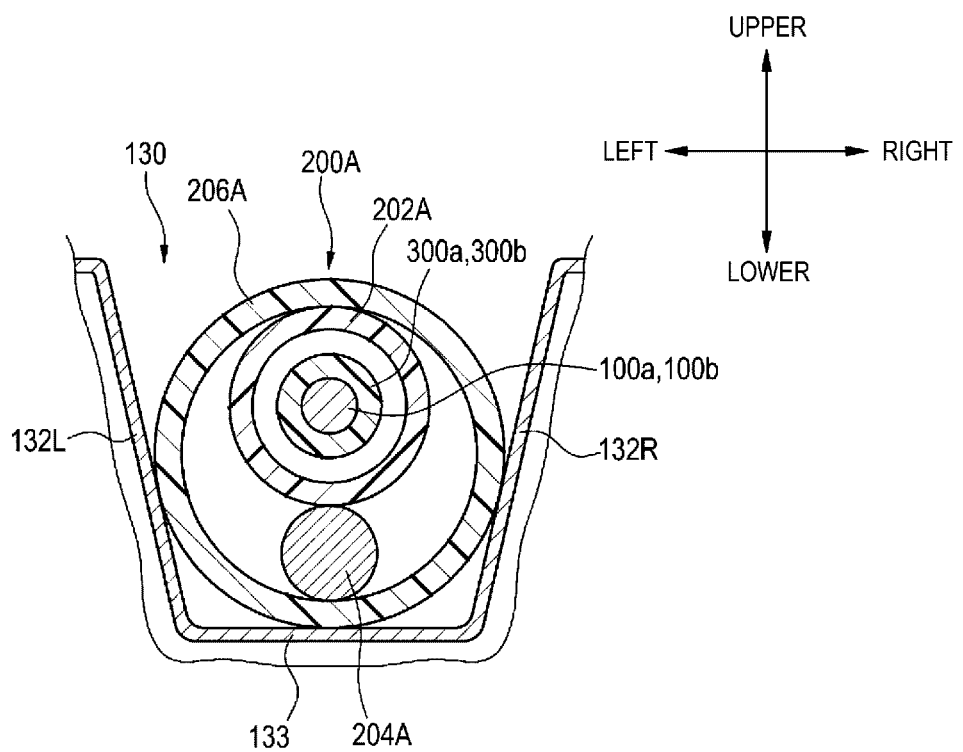
FIG. 6B is a cross-sectional view illustrating a state in which the drop cable reinforcement sleeve is housed in the heater having the related art configuration.

FIG. 6A is a cross-sectional view of a state in which the optical fiber reinforcement sleeve 200 is housed in a heater 130 having a related art configuration. FIG. 6B is a cross-sectional view of a state in which the drop cable reinforcement sleeve 200A is housed in the heater 130 having the related art configuration.

As illustrated in FIGS. 6A and 6B, the heater 130 having the related art configuration includes a bottom surface 133, and a left wall surface 132L and a right wall surface 132R erected upward from both end portions of the bottom surface 133. The left wall surface 132L and the right wall surface 132R are configured such that a distance between the left wall surface 132L and the right wall surface 132R increases from a bottom portion toward a top portion of the heater 130. A maximum distance L3 between the left wall surface 132L and the right wall surface 132R of the heater 130 is set to be slightly larger than a maximum diameter of the drop cable reinforcement sleeve 200A having a large diameter. That is, sizes of the bottom surface 133 and the left and right wall surfaces 132L, 132R of the heater 130 are set such that, when the drop cable reinforcement sleeve 200A is housed in the heater 130, a lower surface of the reinforcement sleeve 200A comes into contact with the bottom surface 133 and two side surfaces of the reinforcement sleeve 200A come into contact with the left wall surface 132L and the right wall surface 132R.

As illustrated in FIG. 6A, when the optical fiber reinforcement sleeve 200 is housed in a central portion of the heater 130, a portion of a lower surface of the reinforcement sleeve 200 comes into contact with the bottom surface 133 of the heater 130. That is, in this case, only one portion of the outer surface of the outer tube 206 of the optical fiber reinforcement sleeve 200 comes into contact with the heater 130. In addition, when the reinforcement sleeve 200 is housed close to a left side or a right side of the heater 130, a portion of the lower surface of the reinforcement sleeve 200 comes into contact with the bottom surface 133, and a portion of a left side surface of the reinforcement sleeve 200 comes into contact with the left wall surface 132L of the heater 130 or a portion of a right side surface of the reinforcement sleeve 200 comes into contact with the right wall surface 132R of the heater 130. That is, in this case, only two portions of the outer surface of the outer tube 206 of the optical fiber reinforcement sleeve 200 come into contact with the heater 130.

As illustrated in FIG. 6B, when the drop cable reinforcement sleeve 200A is housed in the heater 130, a portion of the lower surface of the reinforcement sleeve 200A comes into contact with the bottom surface 133 of the heater 130, a portion of the left side surface of the reinforcement sleeve 200A comes into contact with the left wall surface 132L of the heater 130, and a portion of the right side surface of the reinforcement sleeve 200A comes into contact with the right wall surface 132R of the heater 130. That is, three portions of the outer surface of the outer tube 206A of the drop cable reinforcement sleeve 200A come into contact with the heater 130.

As described above, in a case of using the heater 130 having the related art configuration, the number of contact portions between the optical fiber reinforcement sleeve 200 having a small diameter and the heater 130 is reduced as compared with a case of using the heater 30 according to the present embodiment. That is, a contact area between the reinforcement sleeve 200 and the heater 130 when the optical fiber reinforcement sleeve 200 is housed in the heater 130 having the related art configuration is smaller than a contact area between the reinforcement sleeve 200 and the heater 30 when the optical fiber reinforcement sleeve 200 is housed in the heater 30 according to the present embodiment.

EXAMPLES

An evaluation test was performed in a case where the optical fiber reinforcement sleeve 200 and the drop cable reinforcement sleeve 200A were subjected to heat treatment under predetermined heating conditions using the heater 30 and the heater 130 having the related art configuration which are provided in the reinforcement device 20 as described above. Results are shown in Table 1 below.

TABLE 1

| Items | Example 1 (Heater 30) | | Example 2 (Heater 130) | |
| --- | --- | --- | --- | --- |
| | Optical Fiber Reinforcement Sleeve (Sleeve 200) | Drop Cable Reinforcement Sleeve (Sleeve 200A) | Optical Fiber Reinforcement Sleeve (Sleeve 200) | Drop Cable Reinforcement Sleeve (Sleeve 200A) |
| Heat Treatment Time (sec) | 10 | 100 (Heating: 55 sec, Cooling: 45 sec) | 14 | 100 (Heating: 55 sec, Cooling: 45 sec) |
| Consumed Power Amount (ws) | 340 | 630 | 420 | 630 |

The outer tube 206 of the optical fiber reinforcement sleeve 200 in Table 1 has an outer diameter of 3.5 mm and an inner diameter of 3.1 mm. The length of the reinforcement sleeve 200 in the longitudinal direction is 60 mm. The outer tube 206A of the drop cable reinforcement sleeve 200A has an outer diameter of 6.0 mm and an inner diameter of 5.6 mm. The length of the reinforcement sleeve 200A in the longitudinal direction is 60 mm. The reinforcement sleeves 200, 200A having such configurations were housed in sleeve housing portions of the heaters 30, 130, and a voltage of 10 V to 15 V was applied to each of the heaters 30, 130 to heat the heaters 30, 130 until the heating temperature of the heaters 30, 130 reached 230° C. Then, time until the reinforcement sleeves 200, 200A were sufficiently heat shrunk was measured as heat treatment time [sec]. The heat treatment time is time from the start of heating of the reinforcement sleeve 200, 200A to the end of heating. Specifically, for the optical fiber reinforcement sleeve 200, time until the initial outer diameter being 3.5 mm becomes 3.2 mm was measured as the heat treatment time. Further, for the drop cable reinforcement sleeve 200A, time from the initial outer diameter being 6.0 mm becomes 4.7 mm was measured as the heat treatment time. Based on the heat treatment time measured as described above, a consumed power amount [Ws] from the start of the heat treatment to the end of the heat treatment was calculated.

As a result, as shown in Table 1, for the drop cable reinforcement sleeve 200A, the heat treatment time by the heater of Example 1 (heater 30 according to the present embodiment) was 100 seconds, and similarly, the heat treatment time by the heater of Example 2 (the heater 130 having the related art configuration) was 100 seconds. Therefore, consumed power amounts in Example 1 and Example 2 calculated based on the heat treatment time were both 630 ws. Here, the heat treatment time [sec] for the drop cable reinforcement sleeve 200A in Example 1 and Example 2 includes not only time from the start of voltage application to the heater until the outer diameter of the reinforcement sleeve 200A becomes 4.7 mm (hereinafter, referred to as heating time), but also cooling time until the heater is cooled to a predetermined temperature (for example, 100° C. to around the softening temperature of the reinforcement member) by natural cooling and forced cooling after the heating time.

On the other hand, for the optical fiber reinforcement sleeve 200, the heat treatment time by the heater of Example 1 was 10 seconds and the heat treatment time by the heater of Example 2 was 14 seconds. That is, in the case of using the heater of Example 1, the heat treatment time was shortened by 4 seconds as compared with the case of using the heater of Example 2. Therefore, the consumed power amount calculated based on the heat treatment time was 340 ws with the heater of Example 1 and 420 ws with the heater of Example 2, and the consumed power amount with the heater of Example 1 was reduced by 80 ws than the consumed power amount with the heater of Example 2.

The heater of Example 2 (the heater 130 having the related art configuration) is suitable for a reinforcement sleeve having a large diameter (for example, a drop cable reinforcement sleeve). Therefore, a contact area between the heater and a reinforcement sleeve having a small diameter (for example, an optical fiber reinforcement sleeve) could not be increased. In contrast, the heater of Example 1 (the heater 30 according to the present embodiment) has a stepped shape to cope with reinforcement sleeves having different diameters. Therefore, the heater of Example 1 could improve the thermal efficiency of the reinforcement sleeve having a small diameter without impairing the thermal efficiency of the reinforcement sleeve having a large diameter. Therefore, as shown in the results of Table 1, the heater of Example 1 could shorten the heat treatment time and reduce the consumed power amount when heating the reinforcement sleeve having a small diameter.

As described above, the heater 30 of the reinforcement device 20 according to the present embodiment includes at least the left wall surface 32L (example of a first wall portion) extending along the longitudinal direction of the sleeve housing portion 31 and the right wall surface 32R (example of a second wall portion) facing the left wall surface 32L. The left wall surface 32L and the right wall surface 32R are configured such that the distance between the left wall surface 32L and the right wall surface 32R increases from the bottom portion side toward the top portion side of the sleeve housing portion 31 in the cross-section orthogonal to the longitudinal direction of the sleeve housing portion 31. In the cross-section, the left wall surface 32L and the right wall surface 32R are respectively provided with two bent portions 35L, 36L and two bent portions 35R, 36R. According to this configuration, it is possible to increase the contact area between the heater 30 and each of the optical fiber reinforcement sleeve 200 and the drop cable reinforcement sleeve 200A that have different diameters. Therefore, an amount of heat received by the optical fiber reinforcement sleeve 200 from the heater 30 can be increased without reducing an amount of heat received by the drop cable reinforcement sleeve 200A from the heater 30. As a result, it is possible to shorten the heat treatment time (reinforcement time) for the optical fiber reinforcement sleeve 200 and reduce the consumed power amount of the heater 30. Further, since an amount of heat escaping from an surface of the heater 30 is reduced by increasing a contact area between the heater 30 and a reinforcement sleeve, it is possible to complete the heat treatment for the reinforcement sleeves 200, 200A with a smaller amount of heat than in the related art, which can also contribute to reducing the consumed power amount of the heater 30.

Further, in the reinforcement device 20 according to the present embodiment, the left wall surface 32L of the heater 30 is line-symmetrical with the right wall surface 32R in the cross-section orthogonal to the longitudinal direction of the sleeve housing portion 31. As a result, it is possible to uniformize the heat distribution when the heater 30 is heated and maintain constant thermal shrinkage rates of the reinforcement sleeves 200, 200A that are subject to heat treatment by the heater 30.

Although an example of an embodiment of the present invention has been described above, the present invention is not limited to the above-described embodiment and other configurations can be adopted as necessary.

Figure 7:
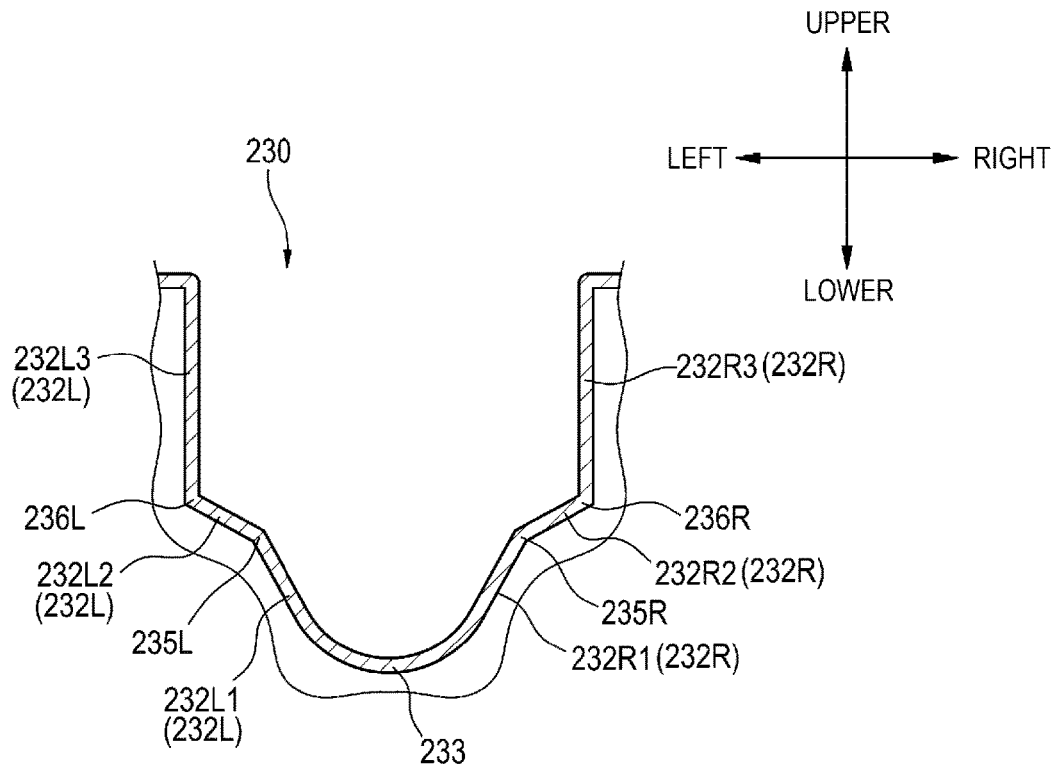
FIG. 7 is a cross-sectional view of a heater according to a first modification.
Figure 8:
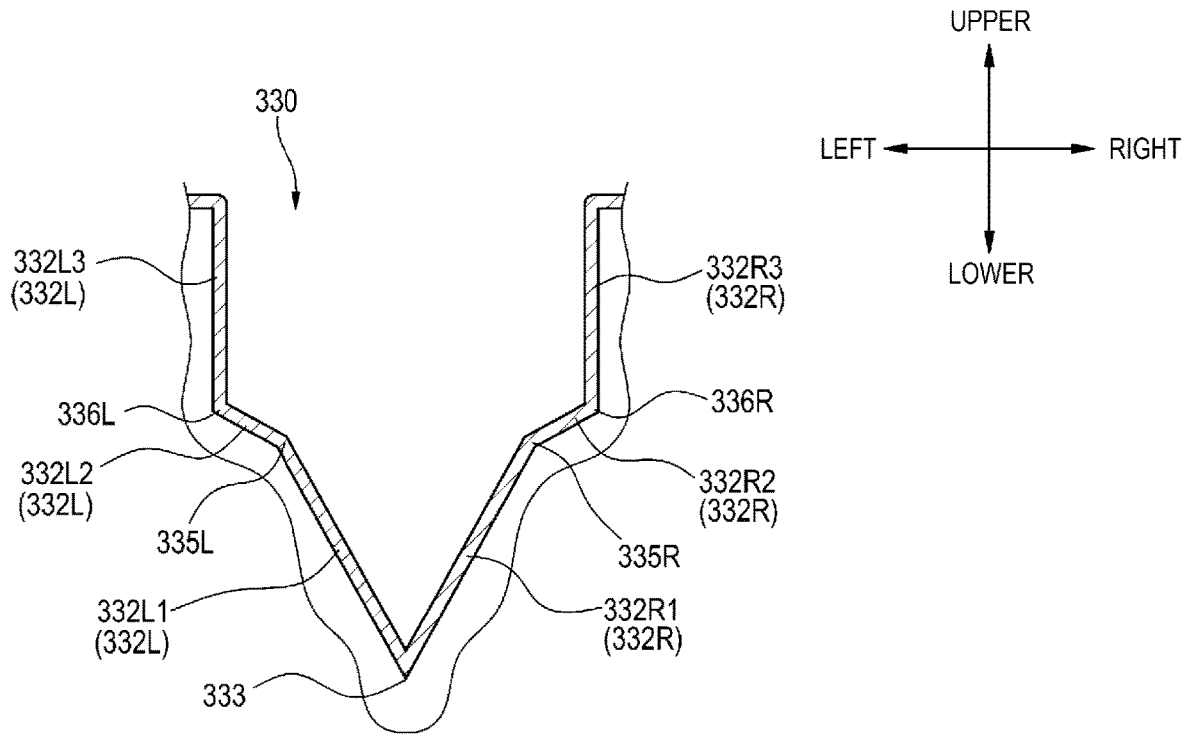
FIG. 8 is a cross-sectional view of a heater according to a second modification.

FIG. 7 is a cross-sectional view of a heater 230 according to a first modification. FIG. 8 is a cross-sectional view of a heater 330 according to a second modification.

As illustrated in FIG. 7, a sleeve housing portion of the heater 230 according to the first modification is similar to the heater 30 according to the above-described embodiment in that a left wall surface 232L includes a lower side surface 232L1, a middle side surface 232L2, and an upper side surface 232L3 that are bent at two bent portions 235L, 236L, and that a right wall surface 232R includes a lower side surface 232R1, a middle side surface 232R2, and an upper side surface 232R3 that are bent at two bent portions 235R, 236R. However, the heater 230 according to the present modification is different from the heater 30 according to the above-described embodiment in that a bottom surface 233 of the heater 230 has a concave curved surface that is continuous with the lower side surface 232L1 and the lower side surface 232R1. The curvature of the bottom surface 233, which is a concave curved surface, is preferably set to be substantially the same as the curvature of the optical fiber reinforcement sleeve 200. According to this configuration, similarly to the above-described embodiment, it is possible to increase a contact area between the heater 230 and each of the optical fiber reinforcement sleeve 200 and the drop cable reinforcement sleeve 200A that have different diameters. Further, when the curvature of the bottom surface 233 which is a concave curved surface is substantially the same as the curvature of the outer surface of the outer tube 206 of the optical fiber reinforcement sleeve 200, the entire lower surface of the optical fiber reinforcement sleeve 200 housed in the sleeve housing portion of the heater 230 comes into contact with the bottom surface 233. For this reason, the contact area between the heater 230 and the optical fiber reinforcement sleeve 200 can be made larger than the contact area between the heater 30 and the optical fiber reinforcement sleeve 200 according to the above-described embodiment, and heating treatment time when the optical fiber reinforcement sleeve 200 is heated by the heater 230 can be further shortened.

As illustrated in FIG. 8, (a sleeve housing portion of) the heater 330 according to the second modification is similar to the heater 30 according to the above-described embodiment in that a left wall surface 332L includes a lower side surface 332L1, a middle side surface 332L2, and an upper side surface 332L3 that are bent at two bent portions 335L, 336L, and that a right wall surface 332R includes a lower side surface 332R1, a middle side surface 332R2, and an upper side surface 332R3 that are bent at two bent portions 335R, 336R. However, the heater 330 according to the present modification is different from the heater 30 according to the above-described embodiment in that the lower side surface 332L1 and the lower side surface 332R1 are directly connected to each other via a vertex 333. That is, a lower side of the heater 330 is formed as an acute groove. With this configuration, similarly to the above-described embodiment, it is also possible to increase a contact area between the heater 330 and each of the optical fiber reinforcement sleeve 200 and the drop cable reinforcement sleeve 200A that have different diameters and sufficiently shorten heat treatment time when the optical fiber reinforcement sleeve 200 is heated by the heater 330.

Figure 9:
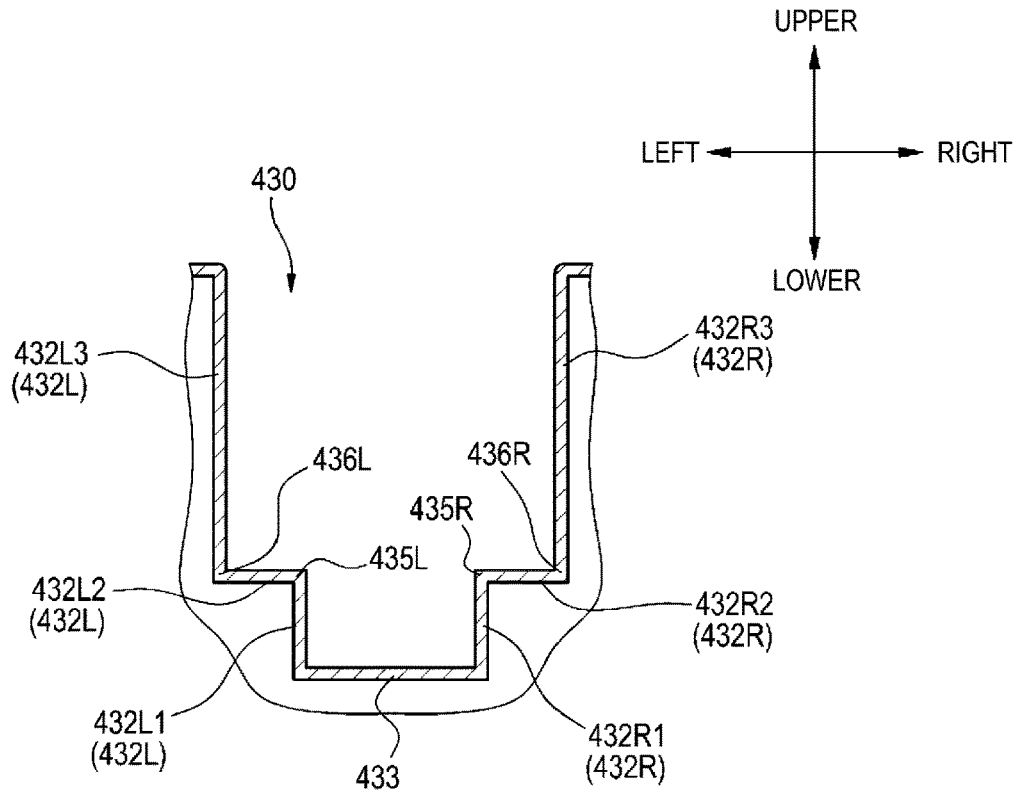
FIG. 9 is a cross-sectional view of a heater according to a third modification.
Figure 10:
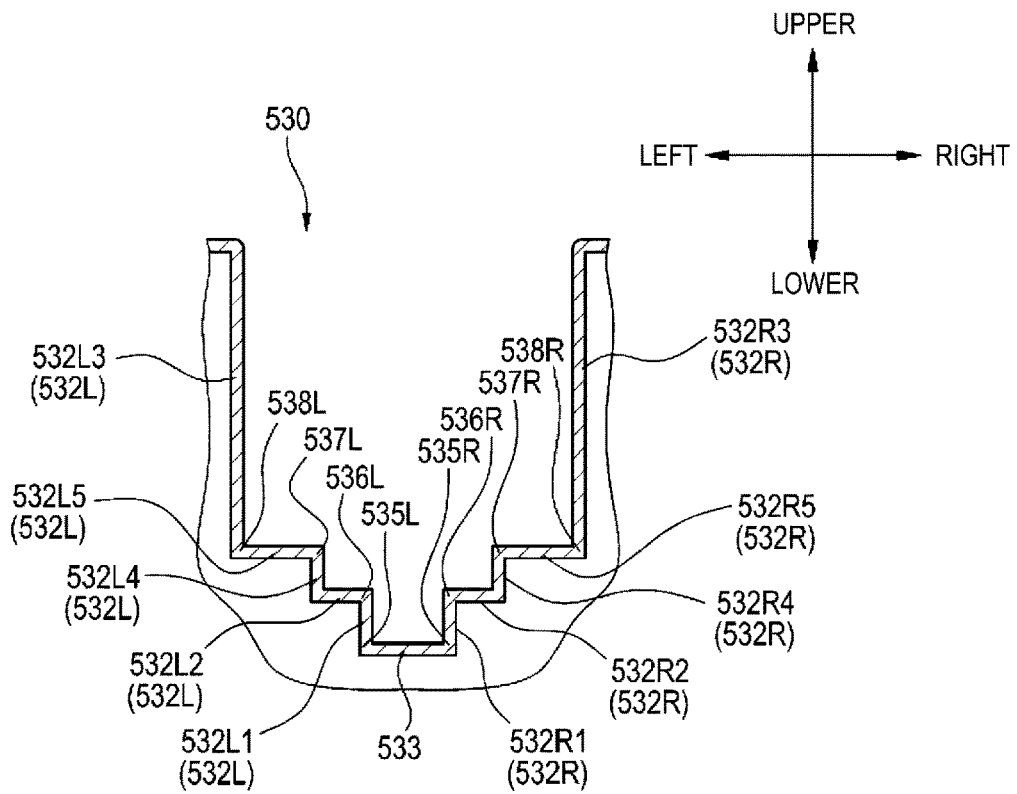
FIG. 10 is a cross-sectional view of a heater according to a fourth modification.

FIG. 9 is a cross-sectional view of a heater 430 according to a third modification. FIG. 10 is a cross-sectional view of a heater 530 according to a fourth modification.

As illustrated in FIG. 9, (a sleeve housing portion of) the heater 430 according to the third modification includes a left wall surface 432L, a right wall surface 432R, and a bottom surface 433. The left wall surface 432L includes a lower side surface 432L1, a middle side surfaces 432L2, and an upper side surface 432L3. The right wall surface 432R includes a lower side surface 432R1, a middle side surface 432R2, and an upper side surface 432R3. The lower side surfaces 432L1, 432R1 are vertically erected from both ends of the bottom surface 433. The middle side surfaces 432L2, 432R2 extend in the left-right direction by bending at bent portions 435L, 435R at a right angle from the lower side surfaces 432L1, 432R1. The upper side surfaces 432L3, 432R3 extend in the vertical direction by bending at bent portions 436L, 436R at a right angle from the middle side surfaces 432L2, 432R2. That is, the heater 430 according to the present modification is different from the heater 30 according to the above-described embodiment in that the bent portions 435L, 435R, 436L, and 436L are bent at a right angle. With this configuration, it is also possible to increase a contact area between the heater 430 and each of the optical fiber reinforcement sleeve 200 and the drop cable reinforcement sleeve 200A that have different diameters and sufficiently shorten heat treatment time when the optical fiber reinforcement sleeve 200 is heated by the heater 430.

As illustrated in FIG. 10, (a sleeve housing portion of) the heater 530 according to the fourth modification includes a left wall surface 532L, a right wall surface 532R, and a bottom surface 533. Each of the left wall surface 532L and the right wall surface 532R bends twice in the left-right direction and twice in the upper-lower direction. That is, the left wall surface 532L includes five surfaces 532L1, 532L2, 532L4, 532L5, and 532L3 continuous from a lower side to an upper side. The surface 532L1 extends upward from a left end of the bottom surface 533. The surface 532L2 is bent at a bent portion 535L at an upper end of the surface 532L1 and extends leftward. The surface 532L4 is bent at a bent portion 536L at a left end of the surface 532L2 and extends upward. The surface 532L5 is bent at a bent portion 537L at an upper end of the surface 542L4 and extends leftward. The surface 532L3 is bent at a bent portion 538L at a left end of the surface 532L5 and extends upward.

Similarly, the right wall surface 532R includes five surfaces 532R1, 532R2, 532R4, 532R5, and 532R3 continuous from the lower side toward the upper side. The surface 532R1 extends upward from a right end of the bottom surface 533. The surface 532R2 is bent at a bent portion 535R at an upper end of the surface 532R1 and extends rightward. The surface 532R4 is bent at a bent portion 536R at a right end of the surface 532R2 and extends upward. The surface 532R5 is bent at a bent portion 537R at an upper end of the surface 542R4 and extends rightward. The surface 532R3 is bent at a bent portion 538R at a right end of the surface 532R5 and extends upward.

As described above, the left wall surface 532L bends at a substantially right angle at each of the four bent portions 535L, 536L, 537L, and 538L. The right wall surface 532R bends at a substantially right angle at each of the four bent portions 535R, 536R, 537R, and 538R. That is, the heater 530 according to the present modification is different from the heater 30 according to the above-described embodiment in that the left wall surface 532L and the right wall surface 532R are respectively bent at the four bent portions 535L to 538L and 535R to 538R. With this configuration, it is also possible to increase a contact area between the heater 530 and each of the optical fiber reinforcement sleeve 200 and the drop cable reinforcement sleeve 200A that have different diameters. Further, a reinforcement sleeve having an outer diameter smaller than that of the optical fiber reinforcement sleeve 200 can be housed in a space defined between the bottom surface 533 and the surfaces 532L1, 532R1, and accordingly the versatility of the heater can be further improved.

Figure 11:
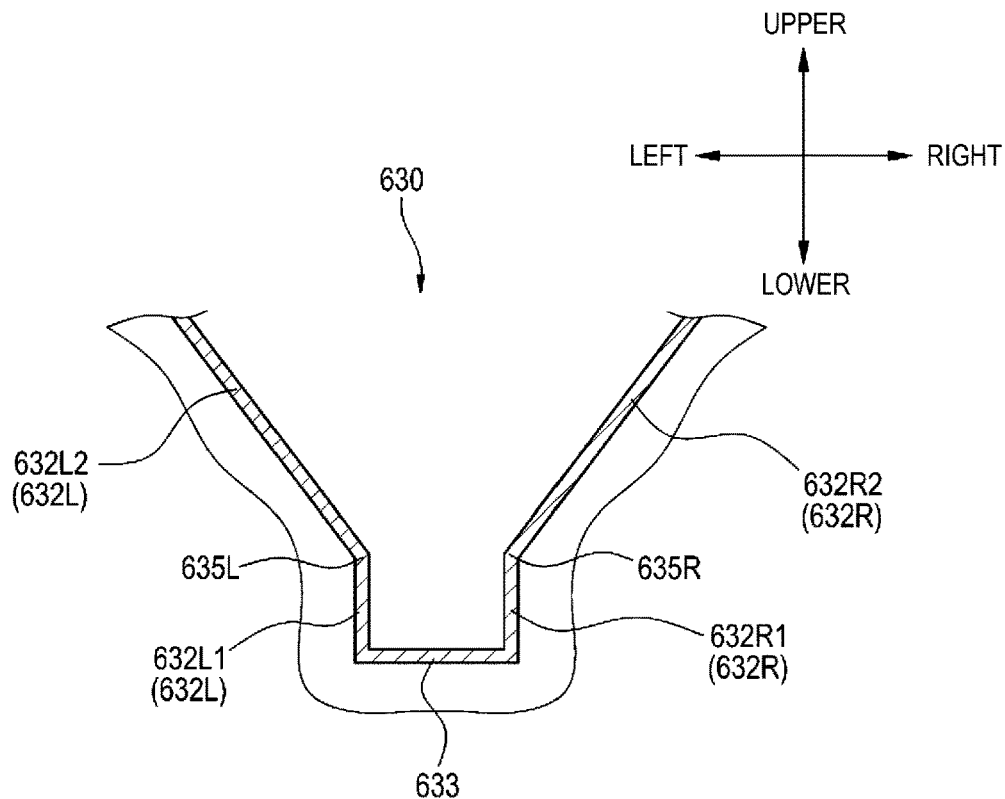
FIG. 11 is a cross-sectional view of a heater according to a fifth modification.
Figure 12:
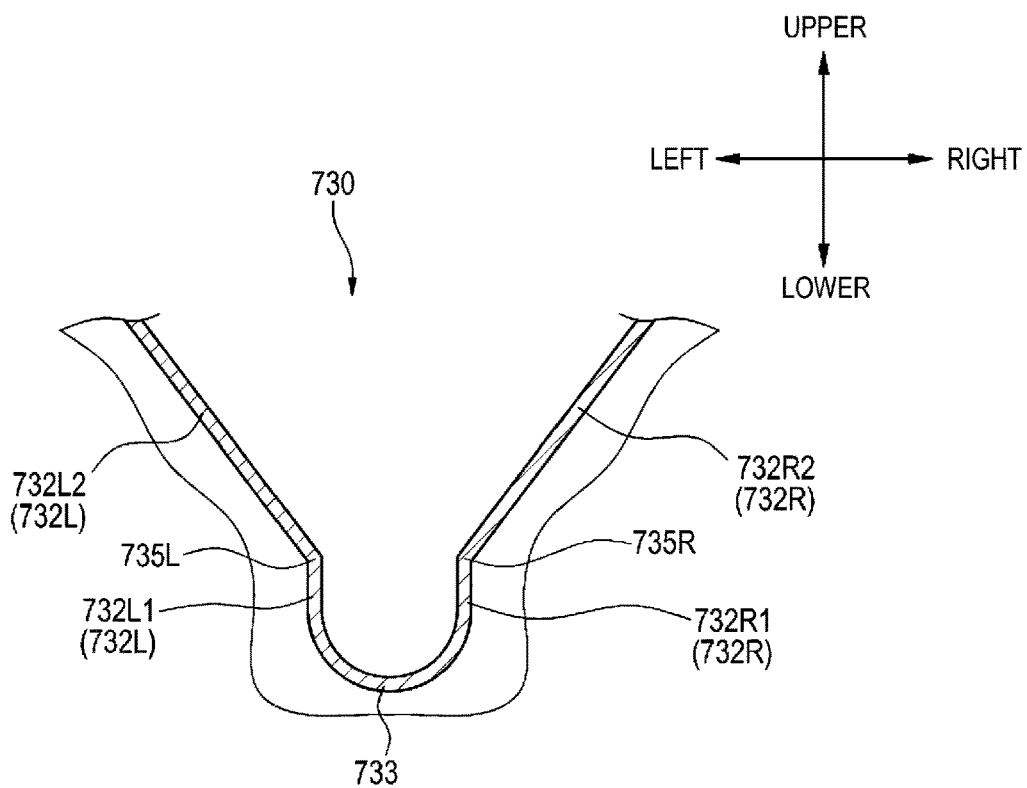
FIG. 12 is a cross-sectional view of a heater according to a sixth modification.

FIG. 11 is a cross-sectional view of a heater 630 according to a fifth modification. FIG. 12 is a cross-sectional view of a heater 730 according to a sixth modification.

As illustrated in FIG. 11, (a sleeve housing portion of) the heater 630 according to the fifth modification includes a left wall surface 632L, a right wall surface 632R, and a bottom surface 633. The left wall surface 632L includes a lower side surface 632L1 and an upper side surface 632L2. The right wall surface 632R includes a lower side surface 632R1 and an upper side surface 632R2. The lower side surfaces 632L1 and 632R1 are vertically erected from both ends of the bottom surface 633. The upper side surface 632L2 of the left wall surface 632L extends obliquely toward the upper-left side from the lower side surface 632L1 via a convex bent portion 635L. The upper side surface 632R2 of the right wall surface 632R extends obliquely toward the upper-right side from the lower side surface 632R1 via a convex bent portion 635R. That is, the upper side surface 632L2 and the upper side surface 632R2 are configured such that a distance between the upper side surface 632L2 and the upper side surface 632R2 increases from a bottom portion side toward a top portion side of the heater 630. As described above, the heater 630 according to the present modification is different from the heater 30 according to the above-described embodiment in that the left wall surface 632L and the right wall surface 632R respectively include one bent portion 635L and one bent portion 635R. With this configuration, it is also possible to increase a contact area between the heater 630 and each of the optical fiber reinforcement sleeve 200 and the drop cable reinforcement sleeve 200A that have different diameters and sufficiently shorten heat treatment time when the optical fiber reinforcement sleeve 200 is heated by the heater 630.

The heater 730 (a sleeve housing portion thereof) according to the sixth modification illustrated in FIG. 12 includes a left wall surface 732L, a right wall surface 732R, and a bottom surface 733. The heater 730 according to the present modification is different from the heater 630 according to the fifth modification in that the bottom surface 733 has a concave curved surface. The curvature of the bottom surface 733, which is a concave curved surface, is preferably set to be substantially the same as the curvature of the outer surface of the outer tube 206 of the optical fiber reinforcement sleeve 200. According to this configuration, similarly to the above-described embodiment, it is possible to increase a contact area between the heater 730 and each of the optical fiber reinforcement sleeve 200 and the drop cable reinforcement sleeve 200A that have different diameters. Further, when the curvature of the bottom surface 733 which is a concave curved surface is substantially the same as the curvature of the outer surface of the outer tube 206, the entire lower surface of the optical fiber reinforcement sleeve 200 housed in the sleeve housing portion of the heater 730 comes into contact with the bottom surface 733. For this reason, a contact area between the heater 730 and the optical fiber reinforcement sleeve 200 according to the present modification can be made larger than the contact area between the heater 30 and the optical fiber reinforcement sleeve 200 according to the above-described embodiment, and accordingly heating treatment time when the optical fiber reinforcement sleeve 200 is heated by the heater 730 can be further shortened.

Figure 13:
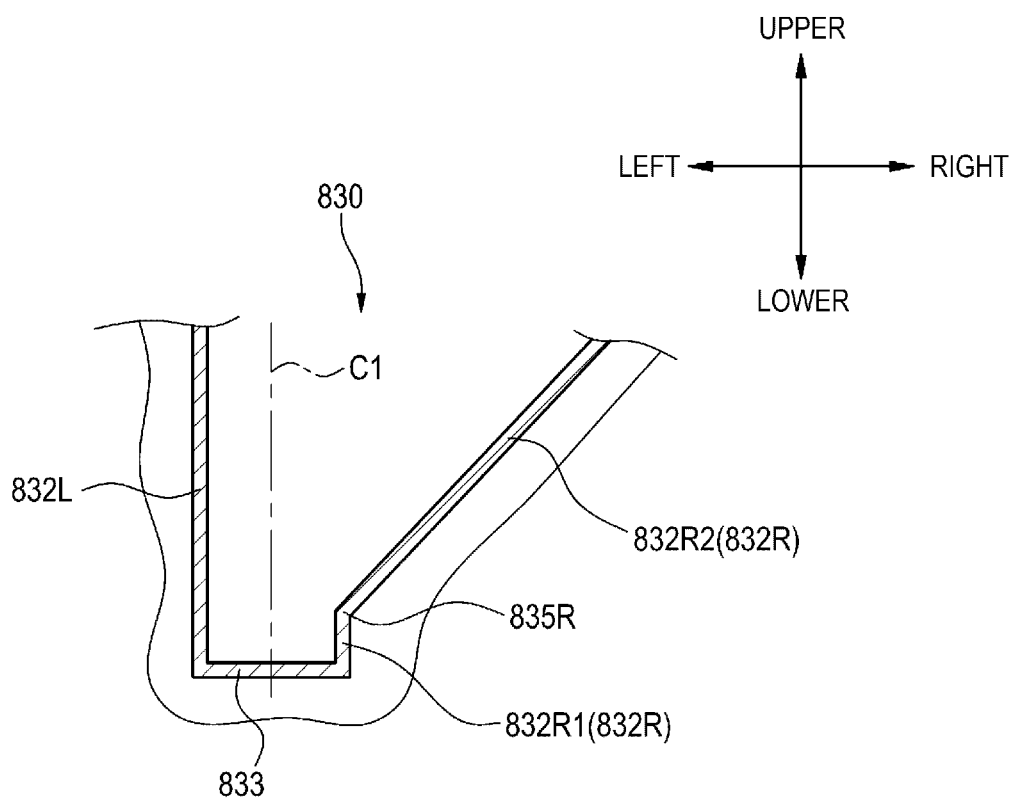
FIG. 13 is a cross-sectional view of a heater according to a seventh modification.
Figure 14:
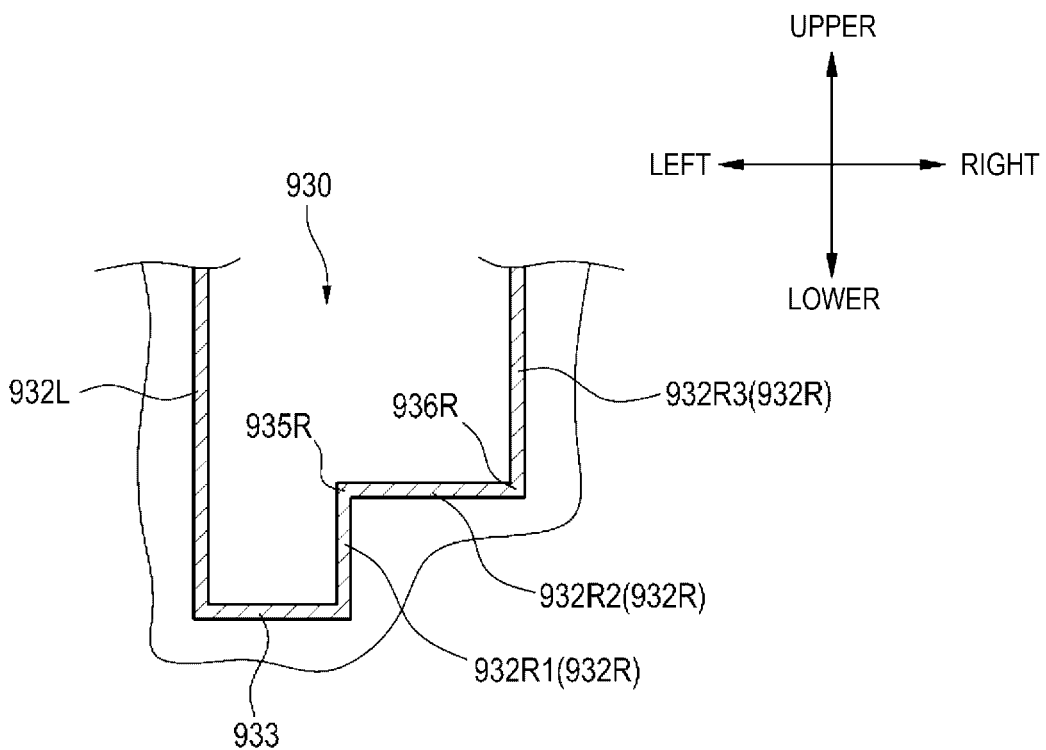
FIG. 14 is a cross-sectional view of a heater according to an eighth modification.

FIG. 13 is a cross-sectional view of a heater 830 according to a seventh modification. FIG. 14 is a cross-sectional view of a heater 930 according to an eighth modification.

As illustrated in FIG. 13, (a sleeve housing portion of) the heater 830 according to the seventh modification includes a left wall surface 832L, a right wall surface 832R, and a bottom surface 833. The left wall surface 832L has a flat surface vertically erected from a left end portion of the bottom surface 833. On the other hand, the right wall surface 832R includes a lower side surface 832R1 and an upper side surface 832R2. The lower side surface 832R1 has a surface vertically erected from a right end of the bottom surface 833. The upper side surface 832R2 extends obliquely toward the upper-right side from the lower side surface 832R1 via a convex bent portion 835R. As described above, the heater 830 according to the present modification is different from the heater 30 according to the above-described embodiment in that the right wall surface 832R includes one bent portion 835R, and that the left wall surface 832L and the right wall surface 832R are not line-symmetric relative to a symmetry axis Cl in the upper-lower direction passing through a center of the bottom surface 833. With this configuration, it is also possible to increase a contact area between the heater 830 and each of the optical fiber reinforcement sleeve 200 and the drop cable reinforcement sleeve 200A that have different diameters and shorten heat treatment time when the optical fiber reinforcement sleeve 200 is heated by the heater 830.

The heater 930 (a sleeve housing portion thereof) according to the eighth modification illustrated in FIG. 14 includes a left wall surface 932L, a right wall surface 932R, and a bottom surface 933. The heater 930 according to the present modification is different from the heater 830 according to the seventh modification in that the right wall surface 932R is bent at two right-angled bent portions 935R, 936R. With this configuration, it is also possible to increase a contact area between the heater 930 and each of the optical fiber reinforcement sleeve 200 and the drop cable reinforcement sleeve 200A that have different diameters and shorten heat treatment time when the optical fiber reinforcement sleeve 200 is heated by the heater 930.

A shape of the heater 30 according to the above embodiment and shapes of sleeve housing portions of the heaters 230 to 930 according to the first to eighth modifications are merely examples. Any shape may be adopted as long as a left wall surface and a right wall surface of a heater constituting a sleeve housing portion are configured such that a distance between the left wall surface and the right wall surface increases from a bottom portion side toward a top portion side of the sleeve housing portion, and that at least one bent portion is formed to at least one of the left wall surface and the right wall surface.

REFERENCE SIGNS LIST

10: optical fiber fusion-splicing apparatus
12: fusion treatment portion
14: opening and closing cover
16: monitor
18: operation unit
20: reinforcement device
22: body portion
23: cover
24: clamp portion
26: heater housing portion
30, 230 to 930: heater
31: sleeve housing portion
32L: left wall surface
32R: right wall surface
33: bottom surface (wall surface)
35L, 35R, 36L, 36R: bent portion
100a, 100b: optical fiber
110: fusion-spliced portion
200: optical fiber reinforcement sleeve
200A: drop cable reinforcement sleeve
202, 202A: inner tube
204, 204A: tensile strength member
206, 206A: outer tube
300a, 300b: drop cable

The invention claimed is:
1. A reinforcement device for an optical fiber fusion-spliced portion, which reinforces a fusion-spliced portion of optical fibers by heating and shrinking a reinforcement sleeve covering the fusion spliced portion, the reinforcement device comprising:
 a heater configured to heat the reinforcement sleeve,
 wherein the heater includes a sleeve housing portion capable of housing the reinforcement sleeve,
 wherein the sleeve housing portion includes at least a first wall portion extending in a longitudinal direction of the sleeve housing portion and a second wall portion facing the first wall portion and extending in the longitudinal direction,
 wherein the first wall portion and the second wall portion are configured such that a distance between the first wall portion and the second wall portion increases from a bottom portion side of the heater toward a top portion side of the heater in a cross-section orthogonal to the longitudinal direction,
 wherein at least one bent portion is formed to both of the first wall portion and the second wall portion in the cross-section, wherein the first wall portion is line-symmetrical with the second wall portion in the cross-section,
wherein the heater further includes a third wall portion connecting an end portion of the first wall portion and an end portion of the second wall portion on the bottom portion side, and
wherein the third wall portion has a concave curved surface.

2. The reinforcement device according to claim 1,
wherein at least two bent portions are formed to each of the first wall portion and the second wall portion in the cross-section.

3. A fusion-splicing apparatus comprising the reinforcement device according to claim 1.

4. A reinforcement device for an optical fiber fusion-spliced portion, which reinforces a fusion-spliced portion of optical fibers by heating and shrinking a reinforcement sleeve covering the fusion spliced portion, the reinforcement device comprising:
a heater configured to heat the reinforcement sleeve,
wherein the heater includes a sleeve housing portion capable of housing the reinforcement sleeve,
wherein the sleeve housing portion includes at least a first wall portion extending in a longitudinal direction of the sleeve housing portion and a second wall portion facing the first wall portion and extending in the longitudinal direction,
wherein the first wall portion and the second wall portion are configured such that a distance between the first wall portion and the second wall portion increases from a bottom portion side of the heater toward a top portion side of the heater in a cross-section orthogonal to the longitudinal direction,
wherein at least one bent portion is formed to both of the first wall portion and the second wall portion in the cross-section, and
wherein the sleeve housing portion is configured to accommodate the reinforcement sleeve and contact the reinforcement sleeve at at least three points, as viewed in the cross section.

5. The reinforcement device according to claim 4, wherein the sleeve housing portion is configured to contact the reinforcement sleeve at four points, as viewed in the cross section.

6. A fusion-splicing apparatus comprising the reinforcement device according to claim 4.

* * * * *